United States Patent
Pasotti et al.

(10) Patent No.: US 10,292,069 B2
(45) Date of Patent: May 14, 2019

(54) SYSTEM AND METHOD FOR MULTI-CHANNEL PACKET TRANSMISSION

(75) Inventors: Marco Pasotti, Vimercate (IT); Paolo Di Prisco, Vimercate (IT); Giuliano Corbetta, Vimercate (IT); Giorgio Barzaghi, Vimercate (IT); Francesco Vodola, Vimercate (IT); Giuseppe De Blasio, Vimercate (IT); Marzio Gerosa, Vimercate (IT); Luca Salgarelli, Brescia (IT); Francesco Gringoli, Brescia (IT)

(73) Assignee: ALCATEL LUCENT, Paris (FR)

( * ) Notice: Subject to any disclaimer, the term of this patent is extended or adjusted under 35 U.S.C. 154(b) by 463 days.

(21) Appl. No.: 13/994,868

(22) PCT Filed: Dec. 13, 2011

(86) PCT No.: PCT/EP2011/072541
§ 371 (c)(1),
(2), (4) Date: Oct. 28, 2013

(87) PCT Pub. No.: WO2012/084597
PCT Pub. Date: Jun. 28, 2012

(65) Prior Publication Data
US 2014/0050087 A1    Feb. 20, 2014

(30) Foreign Application Priority Data
Dec. 20, 2010 (EP) .................................. 10306463

(51) Int. Cl.
*H04W 28/02* (2009.01)
*H04L 12/851* (2013.01)
(Continued)

(52) U.S. Cl.
CPC ..... *H04W 28/0268* (2013.01); *H04L 47/2441* (2013.01); *H04L 47/34* (2013.01);
(Continued)

(58) Field of Classification Search
None
See application file for complete search history.

(56) References Cited

U.S. PATENT DOCUMENTS 6,778,495 B1    8/2004  Blair
7,613,114 B2 *  11/2009 Iwata et al. ................... 370/235
(Continued)

FOREIGN PATENT DOCUMENTS

| EP | 1227624 | 7/2002 |
| EP | 2040420 | 3/2009 |
| JP | 2001358722 | 12/2001 |

*Primary Examiner* — Saba Tsegaye
(74) *Attorney, Agent, or Firm* — McCracken & Gillen LLC

(57) ABSTRACT

A method of transmitting packets wherein said packets are comprised in a plurality of flows, the flows comprising flow characteristics controlling admission of incoming flows. A plurality of admitted incoming flows with the same class of service are inserted into a queue. A committed information rate value corresponding to said queue and a bandwidth available for transmission of said queue according to the identified committed information rate value are identified. An order for transmission for the queues is established based on the class of service of the queue and the identified bandwidth. A plurality of cells of the same size are generated from a plurality of frames and the cells are distributed between a plurality of individual transmission channels according to the ordered defined for transmission. A transmitter equipment and a receiver equipment are also disclosed.

15 Claims, 4 Drawing Sheets

(51) Int. Cl.
*H04L 12/801* (2013.01)
*H04L 12/873* (2013.01)
*H04L 12/863* (2013.01)
*H04W 72/12* (2009.01)
*H04W 28/06* (2009.01)

(52) U.S. Cl.
CPC ........ H04L 47/522 (2013.01); H04L 47/6215 (2013.01); H04W 72/1263 (2013.01); *H04L 47/14* (2013.01); *H04W 28/065* (2013.01); *H04W 72/1252* (2013.01)

(56) References Cited

U.S. PATENT DOCUMENTS

| | | | |
|---|---|---|---|
| 7,737,870 B1* | 6/2010 | Wang | 341/65 |
| 2003/0118052 A1* | 6/2003 | Kuhl | H04L 12/5601 370/474 |
| 2005/0175014 A1* | 8/2005 | Patrick | H04L 12/5693 370/395.43 |
| 2006/0062224 A1* | 3/2006 | Levy et al. | 370/395.6 |
| 2007/0019599 A1* | 1/2007 | Park | H04L 12/5693 370/338 |
| 2007/0171830 A1* | 7/2007 | Vulkan et al. | 370/235 |
| 2007/0189169 A1* | 8/2007 | Wu | H04L 47/2441 370/235 |
| 2008/0056192 A1* | 3/2008 | Strong et al. | 370/331 |
| 2008/0273545 A1* | 11/2008 | Sgouros et al. | 370/412 |

\* cited by examiner

SYSTEM AND METHOD FOR MULTI-CHANNEL PACKET TRANSMISSION

CROSS REFERENCE

This application claims the benefit of European patent application No. EP 10306463.0, filed Dec. 20, 2010 and the benefit of PCT patent application No. PCT/EP2011/072541, filed Dec. 3, 2011, the respective contents of which are hereby incorporated by reference in their entirety.

The present invention relates to packet transmission. In a variant, the invention relates to packet radio transmission.

BACKGROUND ART

Some wireless communication systems are based on packet radio paradigm. An example of such systems is the so-called Ethernet radio systems. Such packet radio systems typically require transmission schemes with the following functionalities:
- exploit as fully as possible the available bandwidth of point-to-point multi-link radio equipments;
- guarantee as much as possible a high level of quality of service (QoS), traffic aggregation and drop precedence;
- dynamic admission control of packets or frames;
- fast restoration of traffic in case of hardware failure;
- no, or insignificant impact on traffic in case of single or multiple radio failure or multi-link throughput change.

SUMMARY

In view of the above requirement, a new approach is desired in designing the architecture of new generation point-to-point multi-link wireless systems. The known protection schemes available on legacy radio equipments (e.g., N:1, N+1 or 1+1) or legacy multilink configuration (such as N+0) typically require that packets are statically mapped into a single link. However, in order to achieve as much as possible a complete load balance in a multi-link system and a per flow/conversation protection engine is desirable to preserve some kind of priority hierarchy among incoming services in most or all conditions. It is further desirable for such engine to operate in real-time and in a transparent manner preferably without disrupting served conversation/flow.

In radio applications, due to the limited availability of spectrum, it is not desirable to waste radio resources (bandwidth). Therefore, an engineered traffic distribution mechanism is typically required that allows for fully (or at least efficiently) exploiting the available resources. Accordingly an intelligent per flow/conversation protection scheme that is autonomously and dynamically capable of discarding low priority flows/conversations and preserve high priority flows/conversations is desirable.

Moreover, with the introduction of Adaptive Coded Modulation (in which the modulation, coding and possibly other parameters are typically adapted according to the conditions present on the radio link), it becomes desirable that traffic aggregation and packet protection be performed with a solution capable of overcoming, or at least substantially obviating, the drawbacks of the static approach which is a solution typically provided by some legacy radio systems. Whenever radio bandwidth changes due to radio propagation condition, it is desired that the traffic impact be limited as much as possible, improving the protection efficiency and potentially approaching a 'hitless' condition.

The more limited the availability of transmission resource (bandwidth) becomes, such as in digital radio transmission systems, the more desirable it becomes to make effective usage of the bandwidth available from parallel transmission resources in a radio multi-link transmission system for packet based traffic.

In addition to the above-described scenario, another variable which may need to be kept under control is the latency of the system. Using one channel at a time for the traffic transmission, the delay experienced packet by packet will typically be the one given by the single link. On the contrary, by considering the entire multi-link array as a single Virtual Link, latency may be reduced to improve the performance of the system.

Some solutions addressing the above problem are already known.

One of such known solutions is based on standard Link Aggregation known as LAG, IEEE 802.1AX-2008.

A non-exhaustive, brief description of some of the functionalities proposed by LAG, IEEE 802.1AX-2008 (for simplification hereinafter referred to LAG) is given below:

The load balancing that can be achieved in LAG is typically strongly dependent on the statistics of the traffic to be spanned over the multi-link transmission system. Typical implementations are based on hashing algorithm that distributes the traffic over the available channels in a random way. The hashing function typically operates on the content of some specific/standard fields of the packets themselves. This approach may not guarantee an effective usage of the total bandwidth available and the results may be even poorer if the traffic is encrypted with mechanisms such as IP-SEC (standing for Internet Protocol Security, which relates to providing security to IP traffic using authentication and encryption on IP packets).

Standard LAG typically addresses physical layers with high reliability (e.g. fiber or copper). The operating status of such physical layers can typically be easily referred to as 'working' or 'not-working' which may correspond to 100% or 0% availability of bandwidth. A change in such status typically happens quite seldom as it can be mainly due to failure (e.g., hardware failure) of the equipment or the line. As a consequence, when a link changes to 'not-working' status, an impact on the traffic can be accepted only because it is coming from failure which is supposed to be a scarce event. On the contrary, when the physical layer is radio with adaptive modulation, the status may correspond to 100% bandwidth availability or less (e.g. 75%, 50%, 25% or 0%) and the change of such status may happen more often as it may be due to radio propagation conditions, e.g. due to weather conditions (which is a normal and expected behavior of radio media).

When one of the links becomes unavailable, the total throughput is then typically reduced: standard LAG typically does not guarantee only the dropping of a low priority traffic. A typical scenario may be the following: LAG foresees a distributor spanning incoming conversation over a set of physical interfaces. Conversations are distributed regardless of their traffic/service type or priority. Once distributed, QoS mechanism applies only on the physical interface and not on the aggregated traffic. In such a way, if physical interface is overloaded with all high priority traffic, even the high priority traffic may be discarded. At the end, LAG first distributes, then deals with priority having QoS on physical interfaces.

Standard LAG typically does not allow spreading conversations over multiple links at the same time, because reordering is not contemplated. This leads to a not guaranteed load balance. When conversations have different bandwidth profiles, allocating each conversation to no more than one channel does not typically allow for fully exploiting the complete multilink available bandwidth. Typically, the residual bandwidth of each single link will be wasted because no conversation can fit into the remaining available capacity.

Standard LAG does not allow to have links with different capacities and to change these capacities dynamically. Additionally, the standard does not allow links having two different capacities in the two directions. This asymmetrical situation may easily occur in presence of adaptive coded modulation.

A non-exhaustive, brief description of some of the functionalities proposed by ML-PPP (RFC1717, RFC2686) are given below:

A session per link typically has to be established in order to exchange link capabilities (e.g. rate, format, compression, . . . ). As a consequence of this negotiation mechanism, it is typically hard to apply a ML-PPP instance over links that change dynamically their own capacity, due to the adaptive coded modulation, and guarantee a hitless traffic distribution.

The usage of adaptive coded modulation potentially may lead to asymmetrical link bandwidth due to different propagation conditions over the wireless media (typically the radio bit rate is symmetrical in both direction. However, as propagation phenomena may be different in forward and backward directions, this may lead to temporary situation in which bit rate becomes asymmetrical)

Padding is contemplated. MLPPP foresees packets fragmentation and distribution over multiple links. Typically fragment are of the same size/length. Whenever a packets cannot be split in integer number of fragments, the last fragment is padded to reach the complete fragment size/length.

Consequently, packet protection, namely traffic distribution without significantly disrupting the served traffic, is typically not available using the above technologies.

Embodiments of the present invention feature a method of transmitting packets wherein said packets are comprised in a plurality of flows comprising frames, each flow comprising a corresponding plurality of flow characteristics comprising at least a committed information rate value and a class of service, the method comprising:

controlling admission of incoming flows;
mapping frames contained in admitted flows into fragments;
inserting a plurality of fragments having the same class of service into a queue;
obtaining a committed information rate value corresponding to said queue;
identifying a bandwidth available for transmission of said queue according to said obtained committed information rate value;
defining an order of transmission for the queue based on the class of service of the queue and the identified bandwidth;
generating a plurality of cells of the same size from a plurality of fragments;
distributing the plurality of cells between a plurality of individual transmission channels according to the order defined for transmission.

According to some specific embodiments, a fragment has a determined size in terms of bytes and the step of mapping frames into fragments comprises:

mapping the entire frame in the fragment if the size of the frame is smaller than the determined size of the fragment; or
breaking the frame into portions of smaller size and mapping one or more of said portions in the fragment if the size of the frame is larger than the determined size of the fragment.

According to some specific embodiments, one or more of said plurality of channels has a load prior to receiving one or more of said cells and said distribution of the plurality of cells on the plurality of individual transmission channels is made by loading a channel being less loaded prior to a channel being more loaded.

According to some specific embodiments, the frames of an incoming flow comprise frame fields and said incoming flow is classified according to one or more frame fields of the frames comprised in said flow before being controlled for admission.

According to some specific embodiments, the method is used in packet radio transmission.

According to some specific embodiments, the method further comprises monitoring the usage of radio resources on each of said plurality of individual transmission channels thereby maintaining knowledge of the load present on a radio link used for such transmission.

Some embodiments of the invention feature a transmitter for transmitting packets wherein said packets are comprised in a plurality of flows comprising frames, each flow comprising a corresponding plurality of flow characteristics comprising at least a committed information rate value and a class of service, the transmitter comprising:

an admission control module for controlling admission of incoming flows;
a compression and fragmentation module for mapping frames contained in admitted flows into fragments and for inserting a plurality of fragments having the same class of service into a queue;
a scheduler for obtaining a committed information rate value corresponding to said queue, for identifying a bandwidth available for transmission of said queue according to said obtained committed information rate value and for defining an order of transmission for the queue based on the class of service of the queue and the identified bandwidth;
a cell generator for generating a plurality of cells of the same size from a plurality of fragments;
a dispatcher for distributing the plurality of cells between a plurality of individual transmission channels according to the order defined for transmission.

According to some specific embodiments, one or more of said plurality of channels has a load prior to receiving one or more of said cells and said dispatcher is configured for distributing said plurality of cells on the plurality of individual transmission channels by loading a channel being less loaded prior to a channel being more loaded.

According to some specific embodiments the frames of an incoming flow comprise frame fields and the transmitter further comprises a classifier for classifying said incoming flow according to one or more frame fields of the frames comprised in said flow before being controlled for admission.

According to some specific embodiments, the classifier is further configured to determine a type of compression and/or fragmentation and/or a class of service and/or a queue for inserting a fragment.

According to some specific embodiments, the transmitter is configured to perform packet radio transmission.

According to some specific embodiments, the dispatcher is configured for monitoring the usage of radio resources on each of said plurality of individual transmission channels thereby maintaining knowledge of the load present on a radio link used for such transmission.

Some embodiments of the invention feature a receiver for receiving transmitted packets the receiver comprising:
- a collector module for receiving a plurality of cells comprising payload information of flows, each cell comprising an identifier field for identifying an order of said cell;
- a reordering module for reordering said received cells, in case said cells are received in disorder, according to the order of identifier field of each received cell;
- a cell terminator and de-framer, for extracting the payload of each received cell, and generating a bit-stream from said payload and separating the bit-stream into fragments;
- a plurality of de-compression modules, each configured reconstructing a frame from said fragments.

According to some specific embodiments, the receiver is configured to receiver packets transmitted through radio transmission.

Some embodiments of the invention feature a packet transmission and reception system comprising the transmitter and the receiver or a transceiver incorporating the transmitter and the receiver as proposed herein.

Some embodiments of the invention feature a computer-executable or machine-executable program product for the implementation of the steps of the method of transmission of packet as proposed herein when such program is run on a computer or a machine.

These and further features and advantages of the present invention are described in more detail, for the purpose of illustration and not limitation, in the following description as well as in the claims with the aid of the accompanying drawings.

DETAILED DESCRIPTION

Figure 1:
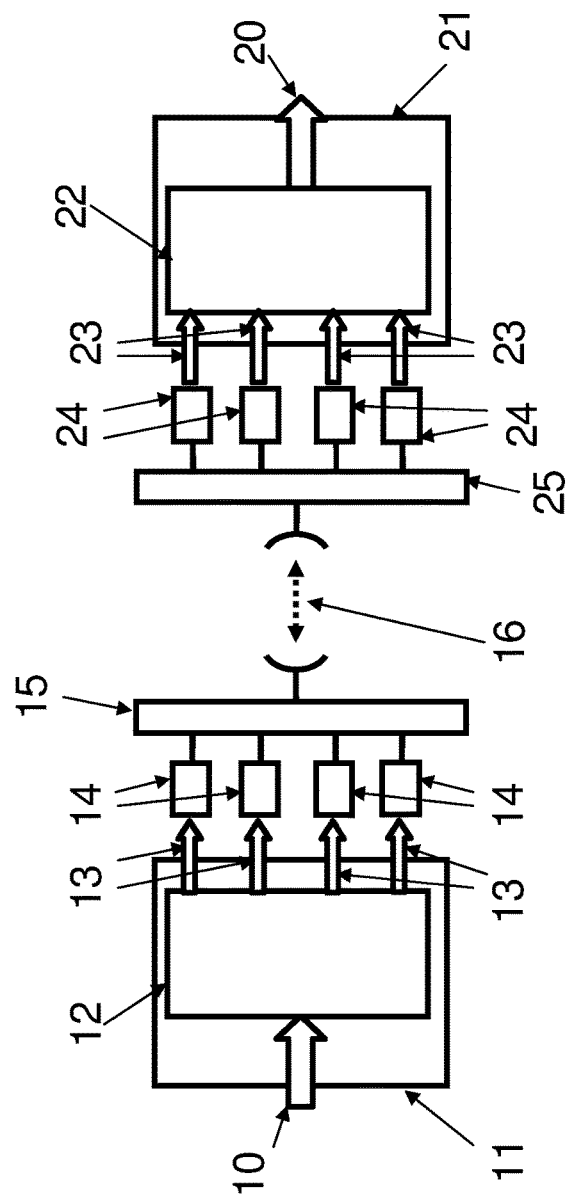
FIG. 1 is an exemplary schematic representation of a conventional point-to-point multi-link radio transmission system.

For a better understanding of the solution proposed herein, a brief description of an exemplary known system is first provided with reference to FIG. 1. In this figure, a conceptual scheme for one possible physical realization of a known point-to-point multi-link radio equipment is represented 1. As shown in the figure an incoming traffic 10 is input into an indoor unit 11 comprising a transmitter module 12 in charge of separating the incoming traffic into a plurality of independent radio channels 13. Each of said independent radio channels 13 is input into a respective microwave transmitter unit 14 which is in charge of transmitting an independent channel through a point-to-point radio connection as generally shown by reference numeral 16 through a branching module 15 which performs an analog sum of the signals to be transmitted.

At the receive side, the individual channels are received by a branching module 25 which allows for discriminating and filtering the different radio channels within a received signal and subsequently forwarding the individual channels to respective microwave receiver unit 24. Each microwave receiver unit 24 at the receive side forwards a respective independent channel 23 towards a base-band processing unit 21 comprising a reception module 22 in charge of reconstructing the original traffic 20 and forward it to external equipment.

The above description of a known point-to-point multi-link radio transmission system is only exemplary and other physical realizations are also possible. However, even if different configurations are used, the problem of an efficient use of the radio resources, as described above, when the input traffic is distributed over a plurality of individual radio channels is typically also present in such different configurations.

Figure 2:
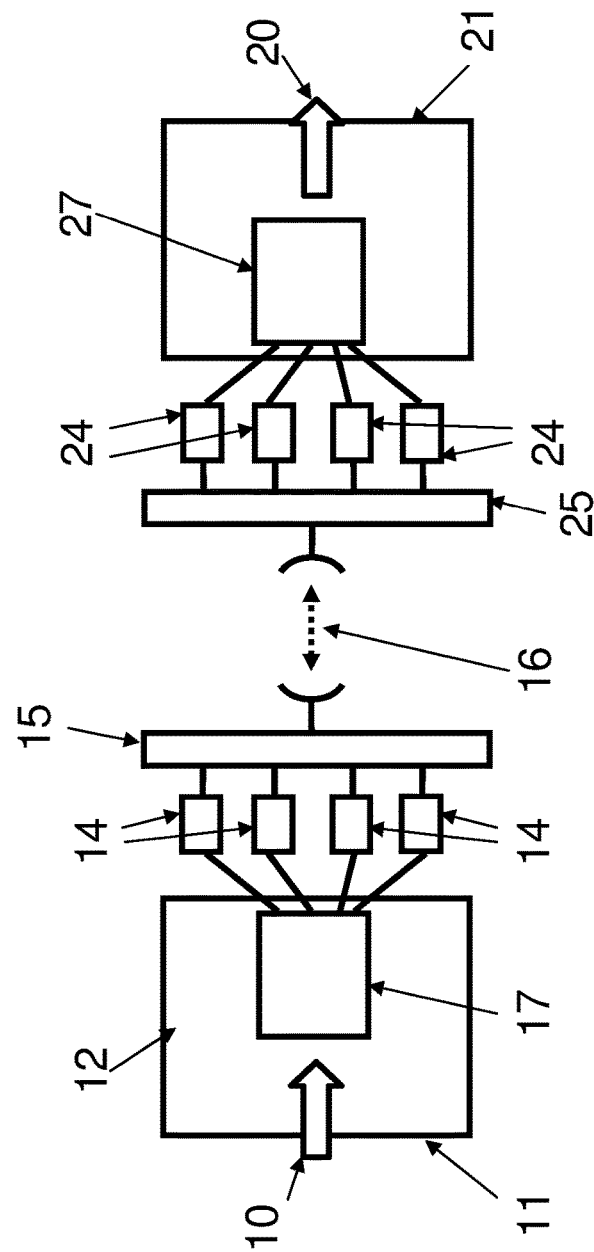
FIG. 2 is an exemplary schematic representation of a point-to-point multi-link radio transmission system according to some embodiments.

FIG. 2 illustrates an exemplary schematic representation of a point-to-point multi-link radio transmission system according to some embodiments. In FIG. 2, like elements have been given like reference numerals as those of FIG. 1.

At the transmit side, a transmission mechanism receives a plurality of incoming flows for transmission through radio. The flows may be of different types (eg. Of different CoS) or sizes (eg. CIR, or bit rate in general) while radio channels may differ in channel space and/or throughput.

It may be mentioned that according to embodiments proposed herein, the transmitter is configured so as to "consider", throughout the process for transmission, an array of multiple radio channels as a single virtual channel that may dynamically change its characteristics (for example throughput or delay). Such changes in the characteristics of the virtual channel may depend on radio propagation conditions or failure affecting one or more radio channels.

In the context of the present specification, the term virtual channel refers to a compound of physical radio channels. Such channel is called virtual because it is not physical radio channel but it has substantially the same parameters of a physical radio channel such as available throughput and delay.

Referring now to FIG. 2, an incoming traffic flow 10 is input into an indoor unit 11 comprising a processing equipment 17. The processing equipment 17 is in charge of processing the flow and provide such processed flow to output channels for transmission as will be described in further detail in relation to FIG. 3. A plurality of microwave transmitter units 14 are in charge of transmitting the processed flow through a point-to-point radio connection as generally shown by reference numeral 16 through a branching module 15. The microwave transmitter unit 14 may be an indoor or an outdoor unit.

At the receive side, a plurality of cells comprising portions of flow are received by a branching module 25 and are input to respective microwave receiver units 24. Each microwave receiver unit 24 at the receive side forwards the cells towards a processing equipment 27 in charge of processing the received cells in order to reconstruct the original traffic 20 and forward it to external equipment as will be described in further detail in relation to FIG. 4. The microwave receiver unit 24 may be an indoor or an outdoor unit.

Conceptually, the transmission process may be summarized, for the sake of illustration and not limitation, in the preferred features described below:

1. Flow Admission Control: a dynamic admission control process is preferably executed in real-time depending on virtual channel characteristics. Such flow admission control procedure may admit some or all of the incoming flows in order to guarantee a desired Service Level Agreement as configured for a particular service. Such admission control may be performed according to the corresponding traffic descriptor which is information typically present in the flows and expressed in terms of for example committed information rate or peak information rate, type of service and CoS.

2. Compression and Fragmentation: a procedure capable of applying frame compression and/or fragmentation in order to achieve radio bandwidth optimization and reduce delay variation for frames belonging to a higher CoS (as these frames may be transmitted among fragments of packets with lower CoS). In such case, the fragment obtained from the original frame is preferably not padded to reach a minimum length. This is because the system is capable of operating with fragments of any suitable length.

3. Congestion management and consequent actions: when the available bandwidth of the virtual channel is not enough, as a result of a decrease in radio channel throughput and/or an increase in input flow rates, a mechanism is preferably employed which is able to queue packets and apply a process of discarding:

a—frames corresponding to flows with input rate higher than the Committed one but less than the Peak Rate (i.e., the so-called "yellow" packets) corresponding to lower priority CoSs (starting from the lowest CoS first); or b—frames corresponding to flows with input rate within the Committed one (i.e., the so-called "green" packets) corresponding to lower priority CoSs (starting from the lowest CoS first); or c—entire flows with input rate within the Committed one, regardless of the CoSs the flows belong to, applicable only when current virtual channel available bandwidth is not enough to sustain such flows; or d—any combination of the above.

The above process is preferably performed in the above order, a to c, however this is not mandatory and other orders may be applied.

As mentioned above, a flow typically has a so-called traffic descriptor associated thereto which contains among others, two main parameters, one being the CIR that is the committed information rate a customer pays for to an operator and the other being the peak information rate (PIR) which is the maximum bit rate a customer is allowed to consume that is considered not guaranteed by the contract subscribed with the operator. Therefore, a bandwidth z between these two values, namely CIR<z<PIR is typically considered as extra (i.e. larger than committed) and based on a particular contract, the equipment is allowed to discard, if necessary, all such packets (so called "yellow packets") exceeding the CIR.

It is to be noted that the committed information rate typically relates to a value which may be zero or a positive non zero value. In this regard a zero value for the CIR means that no commitment is taken in order to deliver the traffic in case of congestion (for example, when the radio bandwidth decreases to failure or radio signal propagation issues). Such value may be available in a data base containing the characteristics of the flow.

4. Scheduling Process: a procedure for scheduling frames transmission on a virtual channel which is preferably capable of reserving bandwidth for each flow, according to the CIR/PIR of the flow, and give priority to higher CoS for transmission. Moreover, the scheduling process may be strictly related to the actual virtual channel available bandwidth and therefore it may be capable of dynamically and automatically following any change is the adaptive modulation schemes and even radio unavailability conditions without impacting significantly the served traffic (under certain conditions of fading speed control).

5. Dispatching Function: a set of "traffic agnostic" dispatching criteria used to perform a load balance operation as complete as possible, having 100% virtual channel bandwidth utilization as target. The dispatching criteria do not imply flows reallocation or traffic impact (under specific conditions of fading speed control) when the throughput of a radio channel changes or becomes temporarily unavailable.

The expression "traffic agnostic" refers to a dispatching operation which does not take into account the CoS because such operation is performed on cells (comprising portions of flows) regardless the original CoS of a flow.

At the receive side, the received data is recombined and rebuilt as a frame stream. This operation is preferably performed without modifying the order of frames (originally received in the form of cells) with same CoS, thereby minimizing the delay of such operation even if the radio channels are working with different throughputs and delays. If the cells are received in a disordered manner, they will be reordered in the receiver side.

Figure 3:
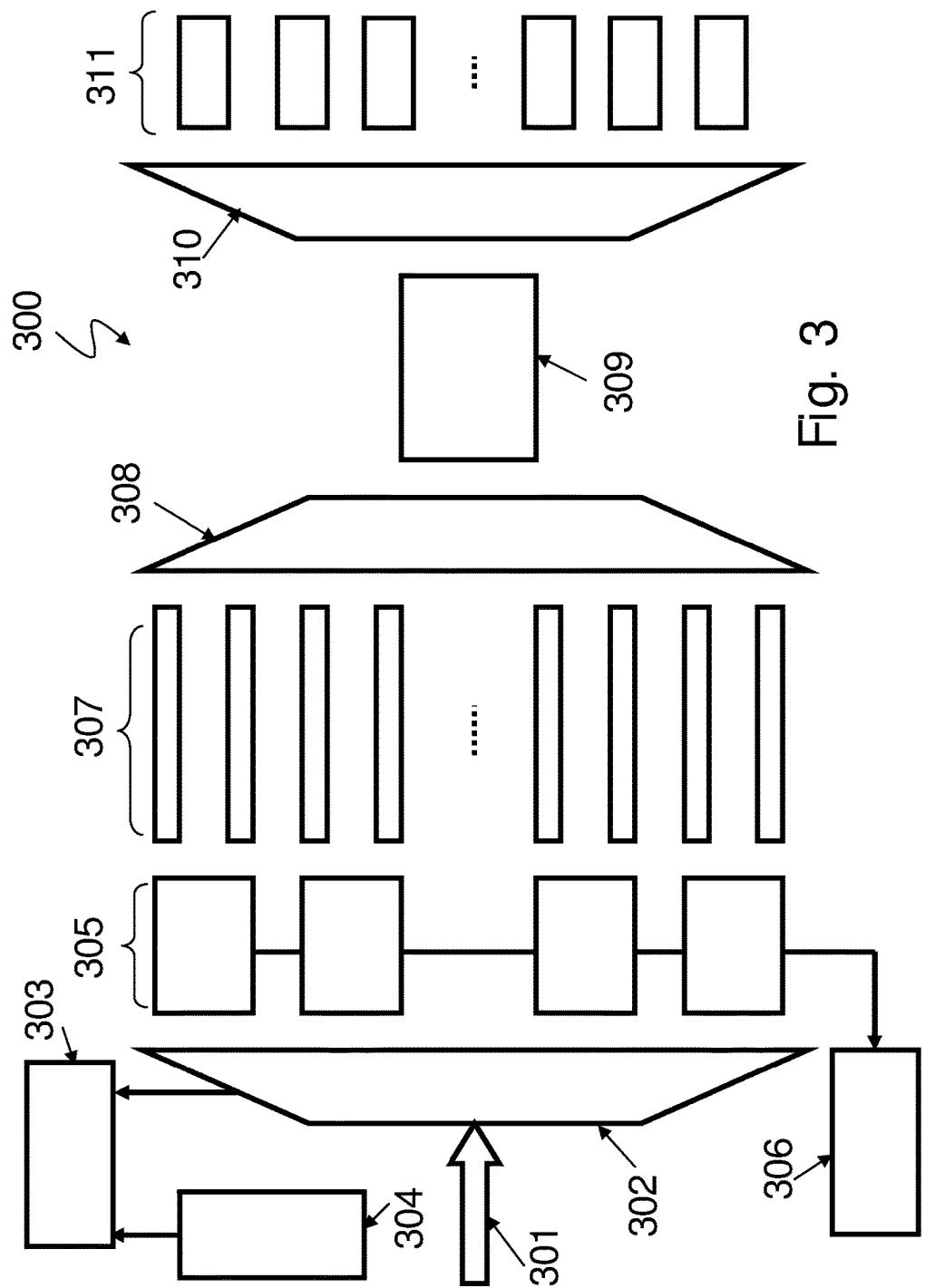
FIG. 3 is an exemplary schematic representation of a transmission side of the point-to-point multi-link radio transmission system of FIG. 2.

A more detailed description of the transmission procedure and the means for carrying our such procedure is now provided with reference to FIG. 3.

FIG. 3 is an exemplary schematic representation of a transmission equipment 300 of the point-to-point multi-link radio transmission system of FIG. 2.

An incoming flow 301 is assumed to be input in the transmission equipment 300 and is preferably classified in a classifier 302 according to a pre-provisioned frame-fields combination.

Frames typically comprise fields. Some examples of such fields may be the following: src/dst MAC address, src/dst IP address, VLAN TAGs, MPLS labels, VLAN TAG priority bits, MPLS label priority bits, which are known fields. However these are not the only fields and other fields may also be present. A classification as mentioned above may be based on a combination of such fields.

The classification process may preferably look up into a data repository 303, herein referred to as flow database, comprising information related to the incoming flow, herein also referred to as flow characteristics. Such flow characteristics may comprise for example committed information rate, compression scheme suitable for a particular flow and a class of service, among other information. The flows may be different in their flow characteristics. The classifier module may be in charge of identifying or distinguishing incoming flows and further determining the class of service of the frame, compression/fragmentation type to be applied, flow CIR+PIR, and accordingly the queue in which the fragments have to be inserted.

An admission control module 304 is preferably used for defining whether a flow may be admitted or not into the system and consequently for keeping the flow database 303 updated with such information.

An admission control decision may be taken by considering the committed information rate value (CIR) of each individual flow. Such decision may be made by evaluating whether a $CIR_i$ associated to the classified i-th flow fits into the virtual channel considered for transmission. Independently from traffic forwarding processing, an admission control logic may guarantee on a per flow basis that:

$$\sum_i^M CIR_i \le B_{Act} \text{ with } i = \{1, \ldots, N\} \text{ and } 0 \le M \le N$$

where N represents the total number of flows provisioned into the system; $B_{Act}$ represents the actual bandwidth available in the array of channels; M represents the current number of admitted flows into the system that may be in a range from 0 (no flow admitted) to N (all flows are admitted). When $B_{Act}$ is not large enough to satisfy the aggregation of all incoming committed flows, the admission control logic may exclude flows one-by-one, from the forwarding process, starting from the lowest CoS and moving up to the highest CoS until the total bandwidth required by the admitted flows fits into the $B_{Act}$.

The flow database 303 may provide the following information associated to the incoming flow:
Admit or Do not Admit
CoS
Compression Scheme Based on service types, the system may support different compression schemes that remove some or all "removable" fields present in the incoming frame that the receiver is capable to reinsert (hence they are removable at transmission side). Such removed fields may be reinserted (e.g. at the receiver side) because they may be dynamically learned by both receiver and transmitter or because a reconstruction method obtained the stripped information from the provisioning.

The transmission equipment 300 may comprise a number of compression and fragmentation engines shown in FIG. 3 by general reference numeral 305. Such compression and fragmentation engines 305 may consult a compression repository 306, such as a database, in order to determine specific compression/fragmentations schemes for each flow.

It is to be noted that flows may be of different size in terms of bytes. However, the fragments used in the system may have a predetermine size in terms of bytes. Such predetermined size may be larger than the entire size of the frame. Should this be the case, the entire frame is mapped into a fragment (having a larger size than the frame). However, in case the frame has a size which is larger than the size determined for the fragment, the frame is broken into portions of smaller size and is mapped into the fragment by mapping said smaller portions of the frame in the fragment.

Based on CoS defined inside the flow database 303, each fragment may be inserted into a corresponding queue (shown in the figure by general reference numeral 307). This is done preferably by the compression and fragmentation engine 305. Such insertion is preferably made such that flows having the same CoS are inserted in the same queue. However it is also possible to have different CoS sharing the same queue.

The transmission equipment further comprises a scheduler 308 configured to identify bandwidth available for transmission of the queues 307 comprising the admitted flows. In practice a CIR value for a flow may be found inside the flow database 303. The scheduler 308 is configured to guarantee that each flow within the same queue has its CIR value satisfied. This may be done by means of known algorithms. This may ensure that a queue does not require a bandwidth above the bandwidth available for such queue.

The scheduler 308 is further configured to define the transmission order according to the CoS and per-queue bandwidth and preferably is not involved in flow dispatching criteria.

In this manner the scheduler 308 generates an ordered sequence of fragments. The sequence of fragments is input into a cell generator 309 in order to generate a bit stream by concatenating fragments. The cell generator 309 additionally, splits the bit stream at a specific bytes size, thereby creating cells.

The cell generator 309 is preferably used in order to get an efficient and preferably full load balance among the available transmission channels. The cell size (in terms of Bytes) is fixed and predefined and corresponds to C bytes (C being a constant positive integer number). Preferably in creating such "cells", an optimal overhead is added in order to increase robustness against radio channel error and minimize the bandwidth usage and reconstruction delay on the receive side. Cells may comprise entire frames or portions thereof. Whenever radio channels are handled by different types of microwave transmitters, it may be appropriate to foresee different cell sizes per different radio channels in order to optimize cells size and structure to specific radio equipment characteristics.

The "cell" stream is then input into a dispatcher 310 for distributing the plurality of cells between a plurality of individual transmission channels (shown by general reference numeral 311). Preferably the dispatcher 310 has knowledge or is capable of measuring the actual load present on each individual channel. The load in one channel may be different as that of another. With such knowledge the dispatcher may distribute the incoming cells, preferably one by one, to the radio interfaces (transmission channels) 311 that are less loaded as compared to other radio interfaces.

A non-limiting description of the functionalities of the dispatcher is provided below.

Minimum dispatching criteria may be realized having different timers associated to each radio interface. Each Timer expires regularly in accordance with the length of time taken for a specific radio interface to send a complete cell. By changing the radio bit-rate, in presence of adaptive coded modulation, the timer changes as well. At timer expiration, the next cell ready to be sent is forwarded towards the radio interface whose timer has expired. By serving timers continuously, each radio interface may be loaded according to its throughput by the dispatcher.

The use of cells of equal size simplifies considerably the distribution criteria because each cell is assumed to be consuming a predefined amount of bandwidth on the radio interface. Therefore by monitoring the usage of radio resources for each radio interface 311, the dispatcher 310 may continuously have knowledge of the load present on the radio link and thus make efficient use of the available resources.

It is to be noted that every cell may experience a different delay on a radio channel due to different conditions. Cells received from radio channels are therefore properly recombined by a reception equipment in order to rebuild the transmitted cell stream. Additional latency introduced to perform this operation may preferably be reduced as much as possible.

Figure 4:
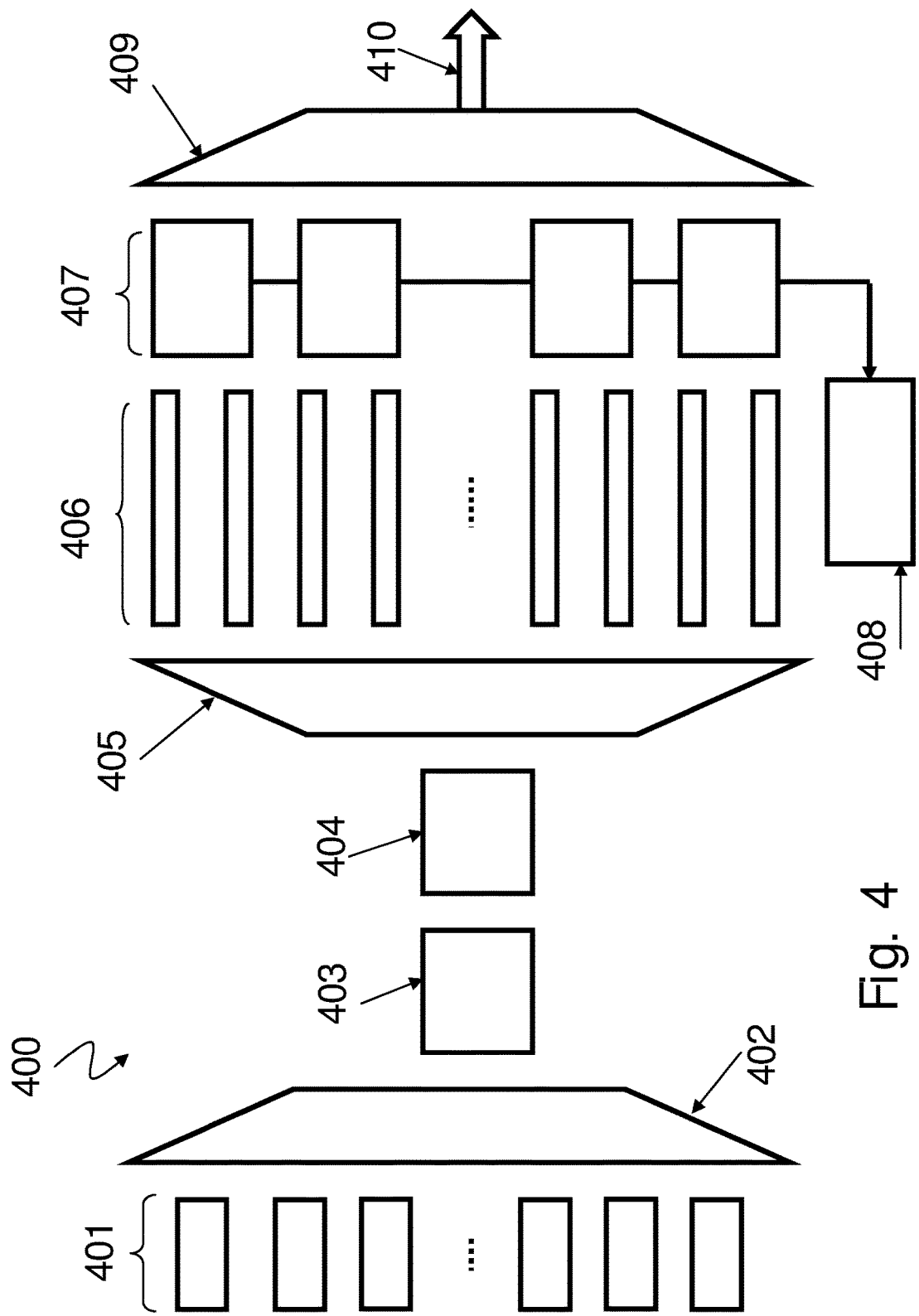
FIG. 4 is an exemplary schematic representation of a reception side of the point-to-point multi-link radio transmission system of FIG. 2.

A detailed description of the reception procedure and the means for carrying our such procedure is now provided with reference to FIG. 4.

As shown in FIG. 4, an array of incoming cells, generally shown by reference numeral 401 is received by the reception equipment 400. Each of the plurality of the incoming cells 401 may comprise fragments as described in relation to FIG. 3.

The plurality of cells 401 is input in a collector module 402 preferably in the form of a multiplexer for providing a multiplex of the incoming cells.

The cells are then output from the collector 402 and input into a reordering module 403 which is in charge of reordering the cells in case such reordering is necessary. Each cell may carry a sequence number inserted at transmit side according to their transmission order. Such sequence number may be inserted in a header field of the cell by the cell generator 309 at transmit side. Therefore at the receive side the reordering block module 403 may recover the original sequence even in case such order has been lost during transmission.

The original sequence, either received in order or after being reordered in case a disorder had occurred during transmission, are then input into a cell terminator and de-framer 404. Next the payloads of the cells are extracted by the cell terminator and de-framer 404. From cell payloads, fragments are formed.

A queue demultiplexer 405 receives the formed fragments from the cell terminator and de-framer 404 and allocates a queue to one or more fragments of frames according to information included in the header of each fragment. A plurality of such queues is generally shown in FIG. 4 by means of reference numeral 406.

The queues containing fragments of frames allocated thereto are then input into respective de-compression modules 407, each configured for de-compressing a frame in order to reconstruct a frame. The de-compressing operation may comprise incorporating additional information such as an overhead to the frame in order to provide the frames with a construction according to their original (before fragmentation) or standard structure. A plurality of de-compression modules is generally shown in FIG. 4 by means of reference numeral 407. In order to obtain information as regards what data is to be added to each individual frame in order to reconstruct such frame, the de-compression modules 407 may consult a compression data repository 408 such as a database.

The reconstructed frames are then input into a multiplexer. The multiplexer 409 is in charge of multiplexing the plurality of reconstructed frames received from the de-compression modules 407 into an output flow 410 which is forwarded to further stages of the system according to the required use.

The transmitter equipment of FIG. 3 and the receiver equipment of FIG. 4 may be used in a packet radio transmission system.

Further, the transmitter equipment of FIG. 3 and the receiver equipment of FIG. 4 may be incorporated in a single equipment, for example a transceiver, capable of performing transmission and reception of packets through radio communication.

The data repositories 303, 306 and 408 may be incorporated in one equipment and used by the transmitter and receiver equipments as a common source or may be different equipments used separately. In the latter case, there may exist a link for exchange of data between such data repositories.

Some of the advantageous features and characteristics of the solution proposed here over the known systems such as Link Aggregation or Multilink PPP are outlined below:

The solution as proposed herein is not affected by an unbalanced traffic distribution (as described in point 5 above)—as it may be the case where other technologies are used—thanks to an agnostic dispatching scheme that may reach up to 100% of aggregated bandwidth usage despite the packet size and bit rate of the served traffic.

The solution as proposed herein can easily handle dynamic congestion situations (as described in point 3 above) that are typical in microwave radio environment where bandwidth typically changes drastically and suddenly because of the propagation phenomena. In cases in which adaptive modulation changes its state or a radio link is declared/considered unavailable, the transmission scheme proposed herein takes a consequent action aimed at keeping the operator expected SLA per CoS and per Flow guaranteed.

The solution as proposed herein is a connectionless technology that may be positioned below the MAC layer and is capable of providing a transparent transport mechanism between two equipments in a multilink point-to-point connection. No session needs to be established by the equipments involved in order to open a communication channel even if each single link can change its throughput in real-time.

The solution as proposed herein is capable of intrinsically operating with physical radio links that have different throughput values in the two directions due to radio fading conditions in presence of adaptive modulation. In such conditions, within the single radio channel, the bit-rate may be bigger or smaller than the bit-rate on the other transmission direction.

The solution as proposed herein may handle heterogeneous links, having different channel space and throughput, guaranteeing the expected SLA and avoiding disorder on the served traffic.

The transmission of packets through radio communication as proposed herein has the capability of distributing conversations in real-time substantially without disrupting or affecting the service carried by each incoming flow (under certain conditions of fading speed).

The solution as proposed herein is capable of handling a sub-portion of served traffic thanks to its fragmentation capability. Differently from other technologies, the fragment obtained from the original frame is not padded to reach a minimum length since the system can operate with fragments of any length.

The usage of the typically expensive resources of radio bandwidth is made more efficient.

The system proposed herein is capable of performing a hitless adaptation when the availability of radio bandwidth changes.

Although the solution proposed herein is presented mainly in the context of multi-link radio equipments, it may likewise be applied to equipments having other type of packet interfaces (e.g. Ethernet interface).

The transmitter, the receiver, the transceiver and the system as proposed herein may include blocks which can be hardware devices, software modules or combination of hardware devices and software modules This method can be advantageously implemented, including means such as an Application Specific Integrated Circuit (ASIC), a Field Programmable Gate Array (FPGA) and/or a microprocessor, and in a preferred embodiment through or together with a software program such as Very high speed integrated circuit Hardware Description Language (VHDL) or C programming language. Therefore, it is understood that the scope of the protection is extended to such a program and in addition to a computer readable storage means having a message therein, such computer readable storage means contain program code means for the implementation of one or more steps of the method, when this program is run on a machine such as a computer, an ASIC, an FPGA or a microprocessor.

The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method of transmitting packets wherein said packets are comprised in a plurality of flows comprising frames, each flow comprising a corresponding plurality of flow characteristics comprising at least a committed information rate value and a class of service, the method comprising:
   controlling admission of incoming flows;
   mapping frames contained in admitted flows into fragments;
   inserting a plurality of fragments having the same class of service into a queue;
   obtaining the committed information rate value corresponding to said queue;
   identifying a bandwidth available for transmission of said queue according to said obtained committed information rate value;
   defining an order of transmission for the queue based on the class of service of the queue and the identified bandwidth;
   generating a plurality of cells of the same size from a plurality of fragments;
   distributing the plurality of cells between a plurality of individual transmission channels according to the order defined for transmission.

2. The method of claim 1 wherein a fragment has a determined size in terms of bytes and the step of mapping frames into fragments comprises:
   mapping the entire frame in the fragment if the size of the frame is smaller than the determined size of the fragment; or
   breaking the frame into portions of smaller size and mapping one or more of said portions in the fragment if the size of the frame is larger than the determined size of the fragment.

3. The method of claim 1 wherein one or more of said plurality of channels has a load prior to receiving one or more of said cells and said distribution of the plurality of cells on the plurality of individual transmission channels is made by loading a channel being less loaded prior to a channel being more loaded.

4. The method of claim 1 wherein the frames of an incoming flow comprise frame fields and said incoming flow is classified according to one or more frame fields of the frames comprised in said flow before being controlled for admission.

5. The method of claim 1 wherein the method is used in packet radio transmission.

6. A transmitter for transmitting packets wherein said packets are comprised in a plurality of flows comprising frames, each flow comprising a corresponding plurality of flow characteristics comprising at least a committed information rate value and a class of service, the transmitter comprising:
   an admission control module for controlling admission of incoming flows;
   a compression and fragmentation module for mapping frames contained in admitted flows into fragments and for inserting a plurality of fragments having the same class of service into a queue;
   a scheduler for obtaining the committed information rate value corresponding to said queue, for identifying a bandwidth available for transmission of said queue according to said obtained committed information rate value and for defining an order of transmission for the queue based on the class of service of the queue and the identified bandwidth;
   a cell generator for generating a plurality of cells of the same size from a plurality of fragments;
   a dispatcher for distributing the plurality of cells between a plurality of individual transmission channels according to the order defined for transmission.

7. The transmitter of claim 6 wherein one or more of said plurality of channels has a load prior to receiving one or more of said cells and said dispatcher is configured for distributing said plurality of cells on the plurality of individual transmission channels by loading a channel being less loaded prior to a channel being more loaded.

8. The transmitter of claim 6 wherein the frames of an incoming flow comprise frame fields and the transmitter further comprises a classifier for classifying said incoming flow according to one or more frame fields of the frames comprised in said flow before being controlled for admission.

9. The transmitter of claim 8 wherein the classifier is further configured to determine a type of compression and/or fragmentation and/or a class of service and/or a queue for inserting a fragment.

10. The transmitter of claim 6 wherein the transmitter is configured to perform packet radio transmission.

11. The transmitter of claim 6 wherein the dispatcher is configured for monitoring the usage of radio resources on each of said plurality of individual transmission channels thereby maintaining knowledge of the load present on a radio link used for such transmission.

12. A receiver for receiving transmitted packets the receiver comprising:

a collector module for receiving a plurality of cells distributed between a plurality of transmission channels, each of said cells comprising payload information fragments of flows, each cell comprising an identifier field for identifying an order of said cell;

a reordering module for reordering said received cells, in case said cells are received in disorder, according to the order of identifier field of each received cell;

a cell terminator and de-framer, for extracting the payload of each received cell, and generating a bit-stream from said payload and separating the bit-stream into fragments;

a plurality of de-compression modules, each configured to reconstruct a frame from said fragments by using information from a data repository.

13. The receiver of claim 12 wherein the receiver is configured to receiver packets transmitted through radio transmission.

14. A packet transmission and reception system for transmitting and receiving packets in a plurality of flows comprising frames, each flow comprising a corresponding plurality of flow characteristics comprising at least a committed information rate value and a class of service, the system comprising:

a transmitter comprising:

an admission control module for controlling admission of incoming flows;

a compression and fragmentation module for mapping frames contained in admitted flows into fragments and for inserting a plurality of fragments having the same class of service into a queue;

a scheduler for obtaining the committed information rate value corresponding to said queue, for identifying a bandwidth available for transmission of said queue according to said obtained committed information rate value and for defining an order of transmission for the queue based on the class of service of the queue and the identified bandwidth;

a cell generator for generating a plurality of cells of the same size from a plurality of fragments; and a dispatcher for distributing the plurality of cells between a plurality of individual transmission channels according to the order defined for transmission;

a receiver comprising:

a collector module for receiving a plurality of cells comprising payload information of flows, each cell comprising an identifier field for identifying an order of said cell;

a reordering module for reordering said received cells, in case said cells are received in disorder, according to the order of identifier field of each received cell;

a cell terminator and de-framer, for extracting the payload of each received cell, and generating a bit-stream from said payload and separating the bit-stream into fragments;

a plurality of de-compression modules, each configured reconstructing a frame from said fragments.

15. A computer-executable or machine-executable program product comprising at least one non-transitory computer-readable storage medium having computer-readable program code portions stored therein, the computer-readable program code portions including instructions for the implementation of the steps of the method of transmission of packets wherein said packets are comprised in a plurality of flows comprising frames, each flow comprising a corresponding plurality of flow characteristics comprising at least a committed information rate value and a class of service, the method comprising:

controlling admission of incoming flows;

mapping frames contained in admitted flows into fragments;

inserting a plurality of fragments having the same class of service into a queue;

obtaining the committed information rate value corresponding to said queue;

identifying a bandwidth available for transmission of said queue according to said obtained committed information rate value;

defining an order of transmission for the queue based on the class of service of the queue and the identified bandwidth;

generating a plurality of cells of the same size from a plurality of fragments;

distributing the plurality of cells between a plurality of individual transmission channels according to the order defined for transmission.

* * * * *